H. L. SULMAN, H. H. GREENWAY & A. H. HIGGINS.
ORE CONCENTRATION.
APPLICATION FILED APR. 30, 1909.
962,678.
Patented June 28, 1910.
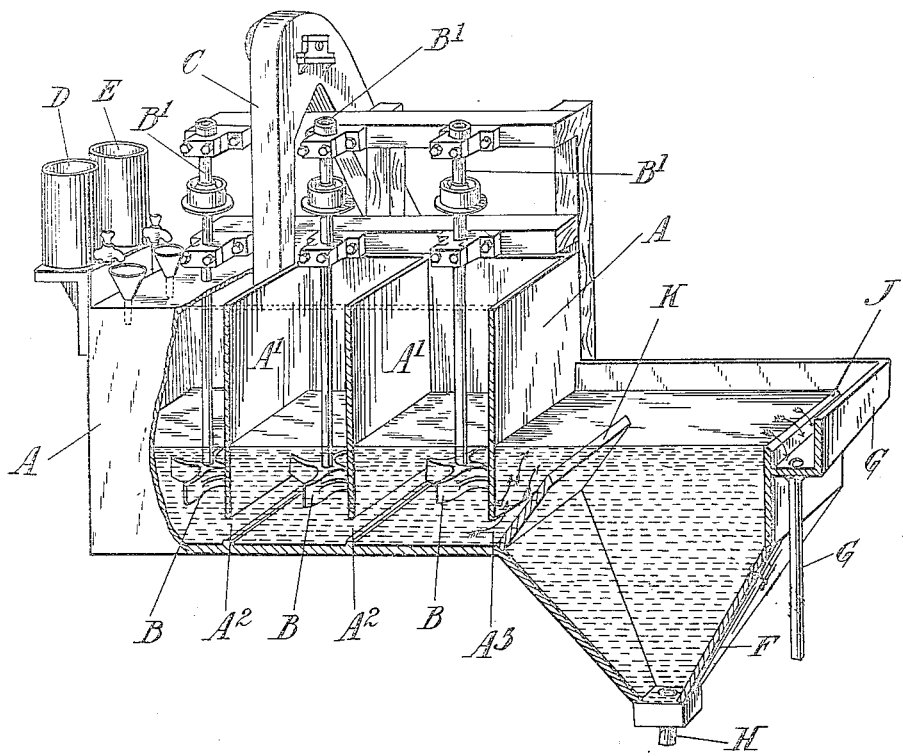

UNITED STATES PATENT OFFICE.

HENRY LIVINGSTONE SULMAN, HENRY HOWARD GREENWAY, AND ARTHUR HOWARD HIGGINS, OF LONDON, ENGLAND.

ORE CONCENTRATION.

962,678.      Specification of Letters Patent.     Patented June 28, 1910.

Application filed April 30, 1909. Serial No. 493,207.

*To all whom it may concern:*

Be it known that we, HENRY LIVINGSTONE SULMAN, HENRY HOWARD GREENWAY, and ARTHUR HOWARD HIGGINS, subjects of the King of England, residing at London, England, have invented certain new and useful Improvements in Ore Concentration, of which the following is a specification.

This invention relates to the concentration of ores, the object being to separate certain constituents of an ore such as metallic sulfids from other constituents such as gangue when the ore is suspended in a liquid such as water.

According to this invention the crushed ore is mixed with water containing in solution a small percentage of a mineral-frothing agent, (that is of one or more organic substances which enable metallic sulfids to float under conditions hereinafter specified) and containing also a small percentage of a suitable acid such as sulfuric acid, and the mixture is thoroughly agitated; a gas is liberated in, generated in, or effectively introduced into the mixture and the ore particles come in contact with the gas and the result is that metallic sulfid particles float to the surface in the form of a froth or scum, and can thereafter be separated by any well known means. Among the organic substances which in solution we have found suitable for use as mineral-frothing agents with certain ores are amyl acetate and other esters; phenol and its homologues; benzoic, valerianic and lactic acids; acetones and other ketones such as camphor. In some cases a mixture of two such mineral-frothing agents gives a better result than a single agent. The above mentioned mineral-frothing agents are all more or less effective in the presence of an acid such as sulfuric acid and are given as types but are not intended to form an exhaustive list of suitable organic substances which may be used in this manner and for these objects. On the other hand there are many organic compounds which in solution will not effect the result described, such as some sugars, dextrin, saponin, albumen, ox gall, etc., and a simple test is required in the case of varying ores or materials to determine which organic compound is most suitable.

The following is an example of one method of carrying this invention into effect:—

Water containing a small percentage of sulfuric acid in solution, say from .2% to 0.5%, and containing in solution a small quantity say 0.1% of one of the foregoing organic substances (say amyl acetate) is, with finely pulverized ore, introduced into an agitating apparatus, in the proportion of say 3 parts by weight of water to 1 part by weight of ore. The agitation is carried out in such a way as thoroughly to disseminate air through the mixture which is thereafter discharged into a spitzkasten. It is found that a coherent froth or scum floats on the surface of the water in the spitzkasten. This froth contains a large proportion of the metallic sulfids but is substantially free from gangue. Any well known means may be employed for collecting the froth. If desired the tailings can be re-treated by the same process with or without the addition of fresh quantities of the organic materials referred to. The action may in some instances be improved by heating the mixture.

The accompanying drawing is a diagrammatic view in perspective illustrating one form of apparatus partly broken away suitable for use in this process. (The apparatus itself forms no part of this invention.)

Several agitation vessels A are placed in series. These may conveniently be large vats separated by partitions $A^1$ having openings $A^2$ at the bottom so that the liquid may pass from one to another. Each vessel is provided with a rotatable stirrer B which is conveniently of the form shown in the drawing. Each stirrer is carried on a spindle $B^1$ rotated at a high speed by any convenient means. Crushed ore or similar finely divided mineral is fed into the first vessel A through any convenient ore-feeding device such as C, and water is also fed into the vessel A. A small proportion of acid, such as sulfuric acid, may be introduced into the water from the feeding vessel D, and a small proportion of one or more other soluble substances which enable metallic sulfids to be floated by air under the conditions hereafter specified, may be introduced from the feeding vessel E. The liquid containing ore in suspension is vigorously agitated in the agitation-vessels and escapes at the outlet $A^3$ highly charged with air.

A settling apparatus consisting of one or more spitzkasten F, is placed immediately at the outlet from the agitation apparatus. As shown in the drawing, the spitzkasten F has a launder G to receive the floating froth which passes away through the outlet G'. The liquid and the sunken material pass out through the outlet H at the bottom of the spitzkasten. The level of the liquid in the spitzkasten is slightly above the lip J. Within the spitzkasten is placed an inclined baffle or guide-plate K, which may be made adjustable, extending upward from below the inlet $A^3$ and arranged to direct the stream of ore-particles and air-bubbles toward the surface of the liquid in the spitzkasten.

Hitherto many proposals have been made for the wet concentration of ores involving the addition to the liquid in which the ore is suspended of an immiscible liquid. For example in the patent granted to Cattermole, Sulman & Picard, United States No. 777274 dated December 13th, 1904, is described a process of ore concentration in which metalliferous particles were coated with a thin film of a fatty or resin acid or a phenol or a cresol by introducing the alkaline compounds of these materials into an acid liquid whereby these materials were liberated in an immiscible or insoluble condition and adhered to the mineral particles. In another known process the powdered ore suspended in water, preferably acidified, is mechanically brought to the surface whereby the particles are exposed to the air and it is found that the metalliferous particles float on the surface while the gangue sinks. In this known process the selective flotation of the metalliferous particles is not due to the metalliferous particles being coated with a selective agent, that is to say, the selective flotation is due to the properties of the metalliferous particles themselves when exposed to air or other gas and brought onto the edge or surface of water preferably acidified.

The present process differs from the two before mentioned types and from other known concentration processes by the introduction into the acidified ore pulp of a small quantity of a mineral-frothing agent i. e., an organic compound in solution of the kind above referred to and by the fact that the metalliferous particles are brought to the surface in the form of a froth or scum not by mechanical means but by the attachment of air or other gas bubbles thereto.

In the frothing processes hitherto known the substances used to secure the formation of a mineral-bearing froth has been oil or an oily liquid immiscible with water. According to this invention the mineral-frothing agent consists of an organic compound contained in solution in the acidified water. We do not confine ourselves to the proportions above given, the best proportion can in each case be easily determined by trial.

It is well known that certain of the organic substances we have referred to are not soluble in water in all proportions and that if used in excess might partly remain insoluble in the acidified water and might become mechanically affixed to the metalliferous particles of the ore. We disclaim any such use of these substances and only claim them in such amount as will enable them to dissolve in the acidified water.

What we claim as our invention and desire to secure by Letters Patent is:—

1. The hereindescribed process of concentrating ores which consists in mixing the powdered ore with water containing in solution a small quantity of a mineral-frothing agent, agitating the mixture to form a froth and separating the froth.

2. The hereindescribed process of concentrating ores which consists in mixing the powdered ore with water containing in solution a small quantity of an organic mineral-frothing agent, agitating the mixture to form a froth and separating the froth.

3. The hereindescribed process of concentrating ores which consists in mixing the powdered ore with slightly acidified water containing in solution a small quantity of a mineral-frothing agent, agitating the mixture to form a froth and separating the froth.

4. The hereindescribed process of concentrating ores which consists in mixing the powdered ore with slightly acidified water containing in solution a small quantity of an organic mineral-frothing agent, agitating the mixture to form a froth and separating the froth.

5. The hereindescribed process of concentrating ores which consists in mixing the powdered ore with water containing in solution a small quantity of a mineral-frothing agent, agitating the mixture and beating air into it in a finely divided state so as to form froth and separating the froth.

6. The hereindescribed process of concentrating ores which consists in mixing the powdered ore with water containing in solution a small quantity of an organic mineral-frothing agent, agitating the mixture and beating air into it in a finely divided state so as to form a froth and separating the froth.

7. The hereindescribed process of concentrating ores which consists in mixing the powdered ore with slightly acidified water containing in solution a small quantity of an organic mineral-frothing agent, agitating the mixture and beating air into it in a finely divided state so as to form a froth and separating the froth.

8. The hereindescribed process of concentrating ores which consists in mixing the powdered ore with slightly acidified water containing in solution a small quantity of an organic mineral-frothing agent, heating the mixture, agitating the mixture and beating air into it in a finely divided state so as to form a froth and separating the froth.

9. The hereindescribed process of concentrating ores which consists in mixing the powdered ore with slightly acidified water containing in solution a small quantity of an organic amyl compound, agitating the mixture to form a froth and separating the froth.

In testimony whereof we have signed our names to this specification in the presence of two subscribing witnesses.

HENRY LIVINGSTONE SULMAN.
   H. HOWARD GREENWAY.
   ARTHUR HOWARD HIGGINS.

Witnesses:
 WALTER J. SKERTEN,
 E. C. WALKER.